US011209682B2

(12) United States Patent
Do et al.

(10) Patent No.: US 11,209,682 B2
(45) Date of Patent: *Dec. 28, 2021

(54) DISPLAY DEVICE

(71) Applicant: LG ELECTRONICS INC., Seoul (KR)

(72) Inventors: Honghae Do, Pyeongtaek-si (KR); Jonggil Pyo, Pyeongtaek-si (KR); Jongman Park, Pyeongtaek-si (KR); Jein Lee, Pyeongtaek-si (KR); Kwangho Choi, Pyeongtaek-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/830,674

(22) Filed: Mar. 26, 2020

(65) Prior Publication Data

US 2020/0225530 A1     Jul. 16, 2020

Related U.S. Application Data

(63) Continuation of application No. 16/103,689, filed on Aug. 14, 2018, now Pat. No. 10,649,258, which is a
(Continued)

(30) Foreign Application Priority Data

| Mar. 8, 2013 | (KR) | ......................... 10-2013-0024854 |
| Mar. 8, 2013 | (KR) | ......................... 10-2013-0024855 |
| Mar. 8, 2013 | (KR) | ......................... 10-2013-0024856 |

(51) Int. Cl.
G02F 1/1333     (2006.01)

(52) U.S. Cl.
CPC .... G02F 1/133308 (2013.01); *G02F 1/13332* (2021.01); *G02F 1/133314* (2021.01);
(Continued)

(58) Field of Classification Search
CPC ......... G02F 1/133308; G02F 1/133322; G02F 1/133314; G02F 1/133317; G02F 1/13332; G02F 2201/46
See application file for complete search history.

(56) References Cited

U.S. PATENT DOCUMENTS

| 6,573,969 B1 | 6/2003 | Watanabe et al. |
| 6,593,979 B1 | 7/2003 | Ha et al. |

(Continued)

FOREIGN PATENT DOCUMENTS

| CN | 1510474 A   | 7/2004 |
| CN | 101539675 A | 9/2009 |

(Continued)

OTHER PUBLICATIONS

International Search Report dated Dec. 11, 2013, issued in Application No. PCT/KR2013/004905.

(Continued)

*Primary Examiner* — Angela K Davison
(74) *Attorney, Agent, or Firm* — Birch, Stewart, Kolasch & Birch, LLP

(57) ABSTRACT

A display device includes a back cover; a plurality of light sources coupled to the back cover; a guide panel positioned at the back cover, the guide panel including a seating portion, and a guide wall portion; a display panel supported on the seating portion of the guide panel; a top case including a front part covering an edge portion of a front surface of the display panel and a lateral part covering the guide wall portion of the guide panel. Further, the lateral part of the top case includes a first part and a second part, the first part being further recessed than the second part. In addition, a fastener that couples the top case, the guide panel, and the back cover by penetrating the first part of the top case, the guide wall portion of the guide panel and an edge of the back
(Continued)

cover, a first end of the fastener is placed at the first part of the top case.

9 Claims, 17 Drawing Sheets

Related U.S. Application Data continuation of application No. 15/415,490, filed on Jan. 25, 2017, now Pat. No. 10,108,037, which is a continuation of application No. 14/989,420, filed on Jan. 6, 2016, now Pat. No. 9,606,388, which is a continuation of application No. 13/918,131, filed on Jun. 14, 2013, now Pat. No. 9,297,947.

(52) U.S. Cl.
CPC .. *G02F 1/133317* (2021.01); *G02F 1/133322* (2021.01); *G02F 2201/46* (2013.01)

(56) References Cited

U.S. PATENT DOCUMENTS

| | | | |
|---|---|---|---|
| 6,979,114 | B2 | 12/2005 | Kao |
| 7,030,546 | B2 | 4/2006 | Han et al. |
| 7,095,462 | B2 | 8/2006 | Ahn |
| 7,113,237 | B2 | 9/2006 | Nitto et al. |
| 7,190,423 | B2 | 3/2007 | Sugawara et al. |
| 7,528,899 | B2 | 5/2009 | Cho |
| 7,576,976 | B2 | 8/2009 | Kawano |
| 8,184,228 | B2 | 5/2012 | Han et al. |
| 8,547,498 | B2 | 10/2013 | Hur et al. |
| 2002/0080297 | A1 | 6/2002 | Sung |
| 2003/0214494 | A1 | 11/2003 | Morishita et al. |
| 2003/0218702 | A1 | 11/2003 | Kwon et al. |
| 2003/0223020 | A1 | 12/2003 | Lee |
| 2004/0239828 | A1* | 12/2004 | Cho ................ G02F 1/133608 349/58 |
| 2006/0244876 | A1* | 11/2006 | Ahn ................ G02F 1/133308 349/58 |
| 2007/0132905 | A1 | 6/2007 | Kim et al. |
| 2007/0132911 | A1 | 6/2007 | Fujiwara et al. |
| 2008/0284940 | A1 | 11/2008 | Choi |
| 2008/0316390 | A1 | 12/2008 | Lin |
| 2010/0188597 | A1 | 7/2010 | Koike et al. |
| 2012/0127391 | A1 | 5/2012 | Ahn et al. |
| 2012/0236204 | A1* | 9/2012 | Kasai ................ G02F 1/133604 348/553 |
| 2013/0044269 | A1 | 2/2013 | Cho et al. |
| 2013/0114003 | A1 | 5/2013 | Tanaka |
| 2014/0055700 | A1* | 2/2014 | Yu ................ G02F 1/133308 349/42 |
| 2014/0132877 | A1 | 5/2014 | Tsao et al. |
| 2015/0181732 | A1 | 6/2015 | Fujikawa et al. |
| 2016/0116790 | A1 | 4/2016 | Do et al. |
| 2016/0313496 | A1 | 10/2016 | Hirayama et al. |

FOREIGN PATENT DOCUMENTS

| | | |
|---|---|---|
| CN | 101765803 A | 6/2010 |
| CN | 102238816 A | 11/2011 |
| EP | 2500765 A1 | 9/2012 |
| JP | 2007-10991 A | 1/2007 |
| JP | 2011-13506 A | 1/2011 |
| JP | 2012-58611 A | 3/2012 |
| KR | 10-2003-0073783 A | 9/2003 |
| KR | 10-2008-0057890 A | 6/2008 |
| KR | 10-2009-0115994 A | 11/2009 |
| KR | 10-2011-0030953 A | 3/2011 |
| WO | WO 2009/034670 A1 | 3/2009 |
| WO | WO 2010/082377 A1 | 7/2010 |

OTHER PUBLICATIONS

U.S. Office Action dated Jul. 6, 2015, issued in U.S. Appl. No. 13/918,131.

* cited by examiner

DISPLAY DEVICE

CROSS-REFERENCE TO RELATED APPLICATIONS

This Application is a Continuation of co-pending U.S. patent application Ser. No. 16/103,689 filed on Aug. 14, 2018, which is a Continuation of U.S. patent application Ser. No. 15/415,490 filed on Jan. 25, 2017 (now U.S. Pat. No. 10,108,037 issued on Oct. 23, 2018), which is a Continuation of U.S. patent application Ser. No. 14/989,420 filed on Jan. 6, 2016 (now U.S. Pat. No. 9,606,388 issued on Mar. 28, 2017), which is a Continuation of U.S. patent application Ser. No. 13/918,131 filed on Jun. 14, 2013 (now U.S. Pat. No. 9,297,947 issued on Mar. 29, 2016), which claims the priority benefit under 35 U.S.C. § 119(a) to Korean Patent Application Nos. 10-2013-0024854, 10-2013-0024855 and 10-2013-0024856, each filed in the Republic of Korea on Mar. 8, 2013, all of which are hereby expressly incorporated by reference into the present application.

BACKGROUND OF THE INVENTION

1. Field of the Invention

This relates to a display device.

2. Discussion of the Related Art

Various flat panel type display devices may provide reduced weight and volume compared to that of older cathode ray tube type display devices. Such display devices may be classified into Liquid Crystal Displays (LCD), Field Emission Displays (FED), Plasma Display Panels (PDP) or Organic Electro Luminescence Diodes (OELD). A display panel may include a back side covered by a rear cabinet and a front edge covered by a front cabinet. A front portion of the front cabinet coupled to the front edge of the display panel may be referred to as a "bezel". A smaller bezel may allow the screen to appear larger.

BRIEF DESCRIPTION OF THE DRAWINGS

The embodiments will be described in detail with reference to the following drawings in which like reference numerals refer to like elements wherein.

DETAILED DESCRIPTION OF THE EMBODIMENTS

Hereinafter, when an element is referred to as being cony or 'under' another element, it may be directly on/under the element, and one or more intervening elements may also be present. When an element is referred to as being cony or 'under', 'under the element' as well as 'on the element' may be included based on the element.

Certain display devices may include a top case and a rear cover fixedly coupled to a front side and a back side of a display module, with a front cabinet and a rear cabinet coupled to a front surface of the top case and a rear surface of the rear cover so the coupling between the top case and the rear cover and various electronic components are not visible. Although such a front cabinet and rear cabinet provide a clean and neat appearance, the double structure may result in a somewhat broad bezel along an edge portion of the display. A thicker bezel may cause the screen to appear smaller and may increase the actual size and weight of the product.

In a display device as embodied and broadly described herein the front cabinet may be omitted so that the bezel is not made unnecessarily thicker, and a number of elements may be reduced.

Figure 1:
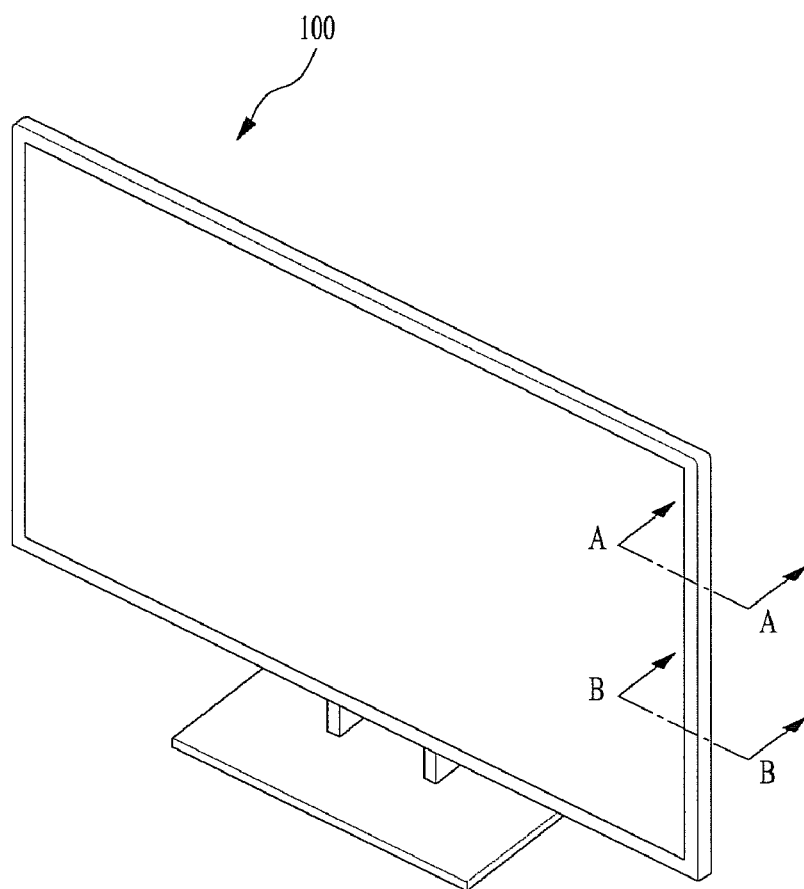
FIG. 1 is a perspective view of a display device according to an embodiment as broadly described herein.
Figure 2:
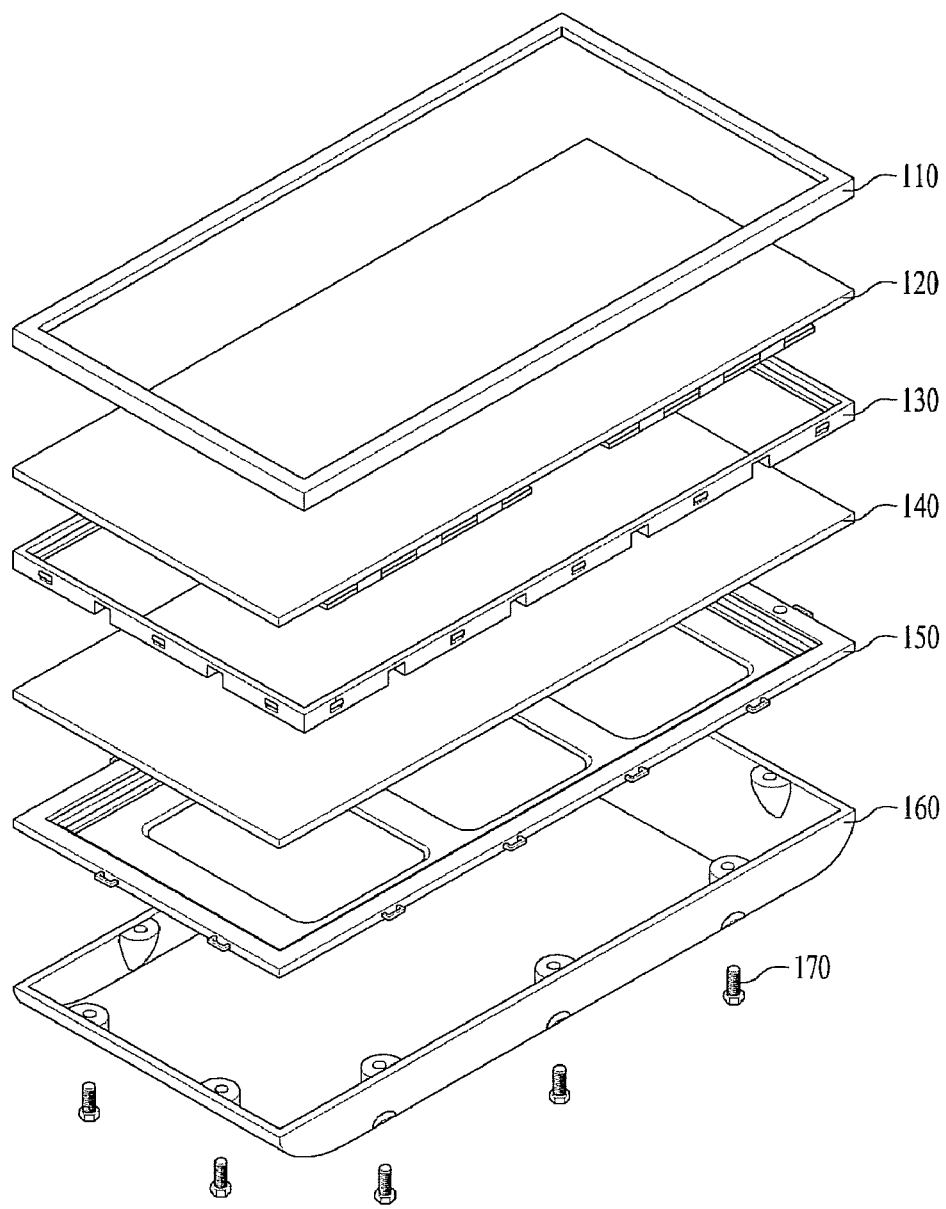
FIG. 2 is an exploded perspective view of the display device shown in FIG. 1.

As shown in FIGS. 1 and 2, a display device 100 may include a top case 110, a display panel 120, a guide panel 130, a light guide panel 140, a back cover 150 and a rear cabinet 160. Screws 170 are also illustrated. The display panel 120, the guide panel 130 and the light guide panel 140 may be layered sequentially to form a display module. The display panel 120 may selectively transmit light provided from a rear surface therethrough by changing arrangement of liquid crystals. The display panel 120 may control transparency and color for each pixel so as to display a screen based on image information. A liquid crystal may be injected between two transparent glasses and electric currents may flow to transparent electrodes formed on the transparent glasses to change the arrangement of the liquid crystals for each pixel, such that the display panel 120 may control the transparency of the pixel.

A light source arranged at a back side of the display panel 120 to provide light may be coupled to the back cover 150 to emit light. The light source may employ a point light source such as a light emitting diode (LED). The light guide panel 140 may supply such point light sources to the back side of the display panel 120 uniformly. The light guide panel 140 may convert the point light sources into surface light sources and emit the surface light sources in a forward direction uniformly. The light guide panel 140 may include a light guide film, a diffusion film and a prism film that are layered sequentially. Other arrangements and/or combinations of films may also be appropriate.

Figure 8:
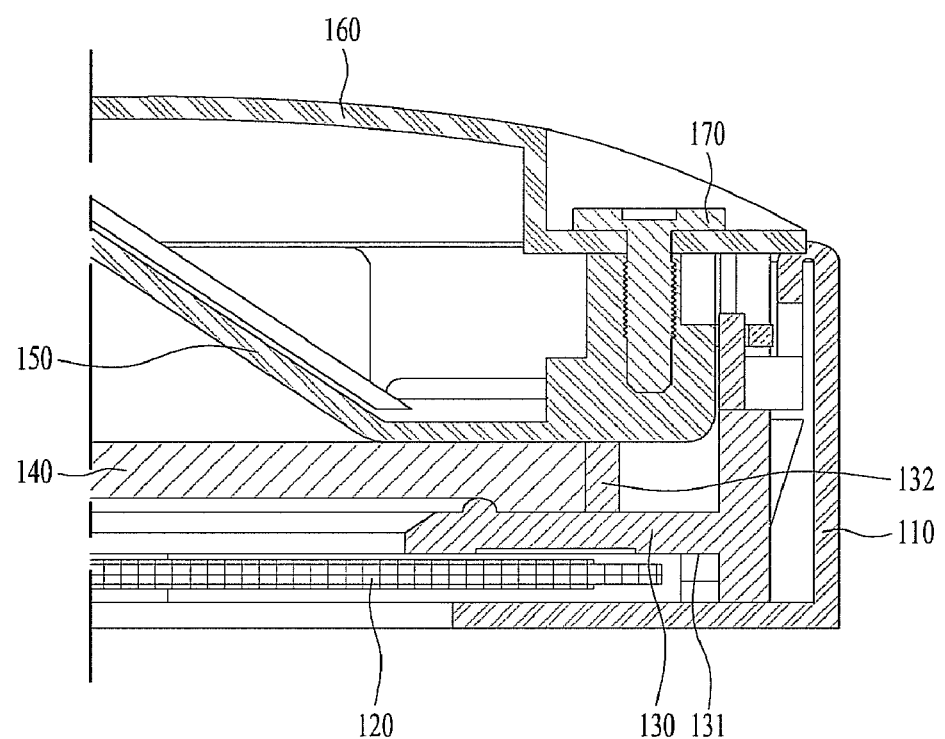
FIG. 8 is a side sectional view of the display device shown in FIGS. 1 and 2.

The guide panel 130 may align the display panel 120 and the light guide panel 140 including the plurality of films. Referring to FIG. 8, which is a sectional view of the display device 100, the guide panel 130 may include a seating portion 131 and a guide wall 132. The seating portion 131 may be formed in a front surface of the guide panel 130 to support an edge portion of a back surface of the display panel 120 and an edge portion of a lateral surface of the display panel 120. The guide wall 132 may be formed in a lateral surface of the guide panel 130 and the films of the light guide panel 140 may be disposed on a back side of the guide wall 132.

The top case 110 is coupled to a front surface of the display module (including the display panel 120, guide panel 130 and light guide panel 140) and the back cover 150 is coupled to a back side of the display module, to fix the resulting layered structure. In this embodiment, the coupling of the top case 110 and the back cover 150 may support the front and back surfaces of the display module with a predetermined force sufficient to keep each layer of the display module together.

When using a coupling member such as a screw, a relatively strong fastening force may be provided and a head portion of the screw may, in some arrangements, be exposed. Accordingly, an exterior appearance of the display device may be adversely affected, and an auxiliary cabinet may be considered to finish the exterior appearance.

According to this embodiment, a coupling portion may be provided in a lateral surface 111 of the top case 110 and coupled to the back cover 150 and the guide panel 130, such that it is not exposed to the outside. The coupling portion formed in the lateral surface 111 of the top case 110 may include a coupling projection 117 and a stepped protrusion 114 that are coupled to a coupling groove 155 of the back cover 150 and a hooking protrusion 135 of the guide panel 130. A front surface 115 of the top case 110 is also shown.

In certain embodiments, coupling groove 155 may be formed in one of the back cover 150 or the guide panel 130, and the hooking protrusion 135 may be formed in the other. In other words, the top case 110 may include a coupling portion configured to be coupled to the back cover 150 and the guide panel 130.

The coupling groove 155 and the coupling protrusion 117 may be coupled to each other in a male/female coupling structure inserted in a backward direction from the front surface, to prevent shaking in a lateral direction. The hooking protrusion 135 and the stepped protrusion 114 may be coupled to prevent forward shaking of the top case 110.

The back cover 150 may be coupled to an inner portion of the guide panel 130 and the lateral surface 111 of the top case 110 may be coupled to an outer portion of the guide panel 130. Accordingly, the guide panel 130 may be partially cut away to couple the hooking protrusion 135 or the coupling groove 155 of the back cover 150 to the coupling portion of the top cover 110, such that the hooking protrusion 135 or the coupling groove 155 formed in the back cover 150 may be exposed to the lateral surface.

The hooking protrusion 135 may be formed in the top case 110 and the coupling groove 155 may be formed in the back cover 150. Alternatively, the coupling groove 155 may be formed in the guide panel 130. For ease of explanation and illustration, in this embodiment, the hooking protrusion 135 will be formed in the top case 110 and the coupling groove 155 will be formed in the back cover 150, understanding that alternative arrangements may also be appropriate.

Figure 3:
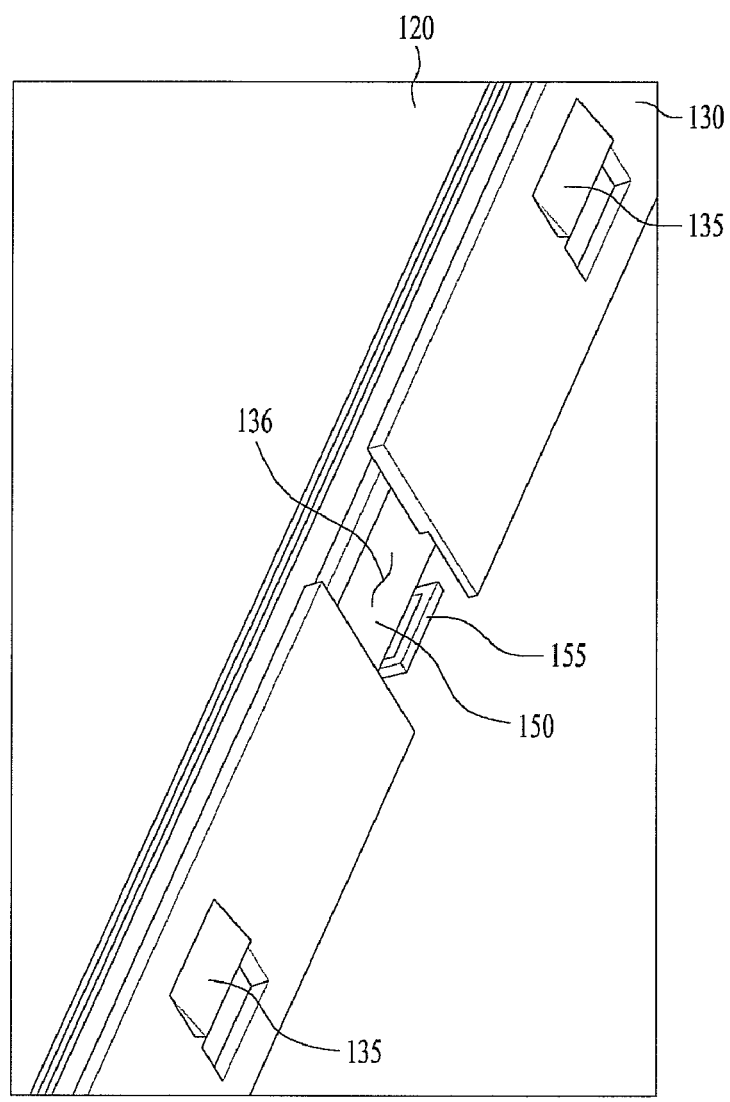
FIG. 3 is a partial perspective view of a top case cut away from the display device shown in FIGS. 1 and 2.

FIG. 3 is a partial perspective view of the top cover 110 separated from the display device 100. In FIG. 3, the display panel 120, the guide panel 130 and the back cover 150 are shown. The back cover 150 is inserted in the guide panel 130 shown in FIG. 2 and the light guide panel 140 is disposed between the guide panel 130 and the back cover 150. The coupling groove 155 is formed in an edge area of the back cover 150. The coupling groove 155 is configured to receive the coupling projection 117 formed in the top case 110. In FIG. 3, the coupling groove 155 has a penetrating hole shape and the coupling projection 117 is inserted in the coupling groove 155 in a direction toward the front surface.

Figure 4:
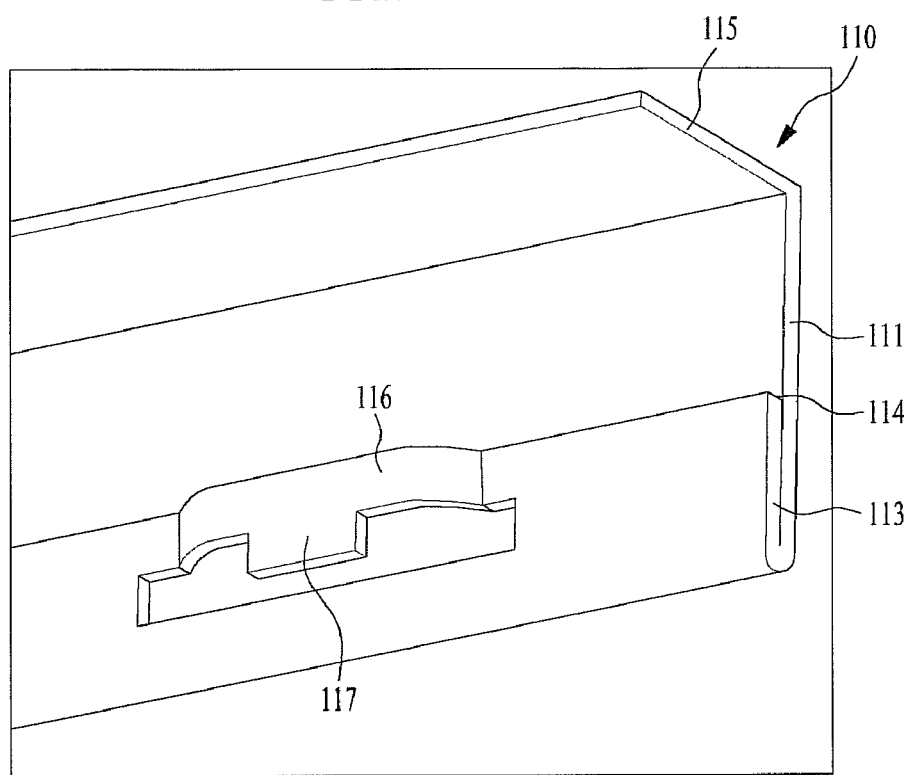
FIG. 4 is a partial perspective view of an inside of a top case of the display device shown in FIGS. 1 and 2, according to an embodiment as broadly described herein.
Figure 5:
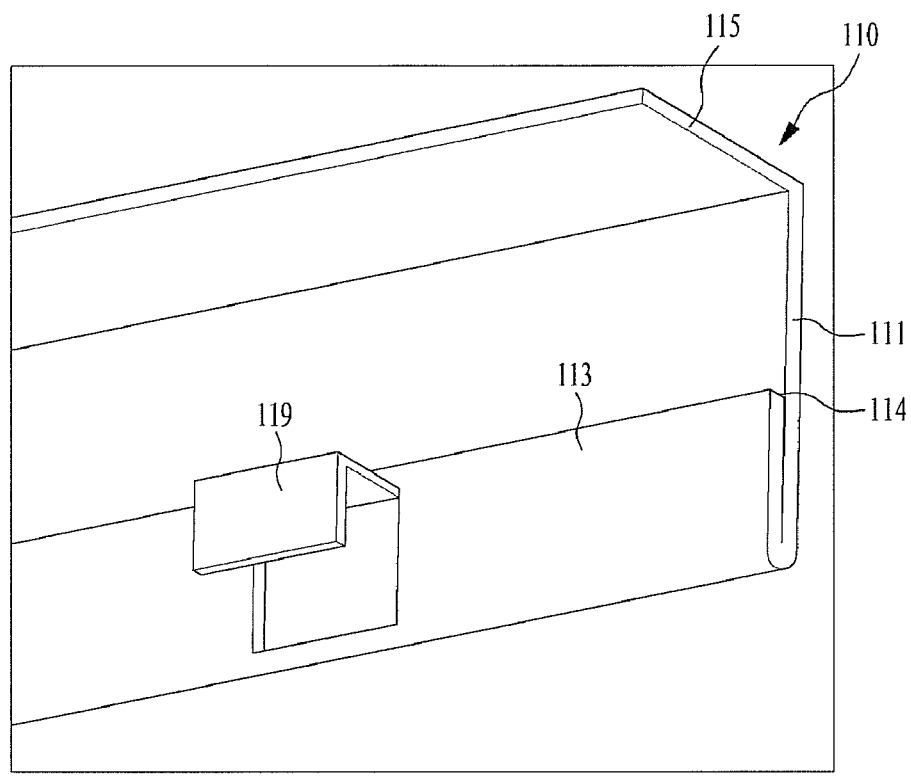
FIG. 5 is a partial perspective view of an inside of a top case of the display device shown in FIGS. 1 and 2, according to another embodiment as broadly described herein.

FIGS. 4 and 5 are partial perspective views of an inner portion of the top case 110 having the coupling projection 117 formed therein. The coupling projection 117 is projected inward and extended toward the back surface. In FIGS. 4 and 5, an end of a lateral surface 111 of the top case 110 is folded inward to form a hem 113, with a predetermined portion of the hem 113 cut and bent to form the coupling projection 117. The coupling projection 117 may employ a double structure using the hem 113 so that the coupling projection 117 is not exposed to the outside by the top case 110, which may function as an exterior finishing material.

When the portion 116 partially cut away in a pulse wave shape is bent inward as shown in FIG. 4, the coupling projection 117 projected inward and extended toward the back surface may be formed. Alternatively, the portion may be cut away in a convex shape toward the back surface, and may be bent twice as shown in FIG. 5, such that a coupling projection 119 projected inward and extended toward the back surface may be formed.

In addition to the embodiments shown in FIGS. 4 and 5, the structure of the coupling projection 117 may vary, as long as the shape thereof is projected inward and extends toward the back surface. The coupling projection 117 may be inserted into the coupling groove 155 from the front surface. The coupling groove 155 and the coupling projection 117 may be insertedly coupled to each other in a male/female coupling structure to fix the top case 110 and the back cover 150, without moving in a lateral direction.

Figure 6:
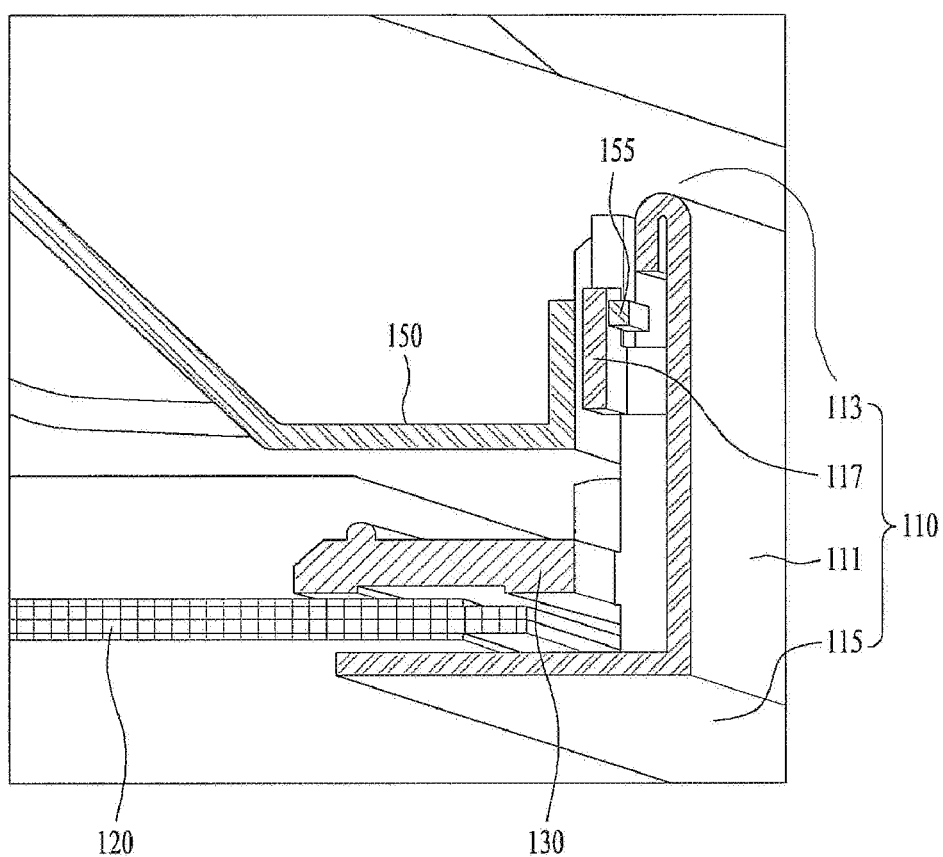
FIG. 6 is a side sectional view taken along line A-A' shown in FIG. 1.

FIG. 6 is a sectional view taken along line A-A' shown in FIG. 1 and shows the coupling projection 117 coupled to the coupling groove 155. In FIG. 6, a lower portion of the top cover 110 is positioned on the front surface of the display device 100.

The stepped protrusion 114 and the hooking protrusion 135 may be provided to prevent the top case 110 from separating in a forward direction. The hooking protrusion 135 may formed at an outer surface of the guide panel 130 and a step may be formed at a back surface of the guide panel 130. As shown in FIG. 3, projection of the hooking protrusion 135 may gradually increase from the front surface toward the back surface, in other words, the hooking protrusion 135 may have a triangular-shaped cross section. During coupling, the top case 110 may slide along the inclined surface to allow the hooking protrusion 135 to be smoothly coupled to the stepped protrusion 114.

The stepped protrusion 114 to be coupled to the hooking protrusion 135 may be formed in the lateral surface 111 of the top case 110 in various methods. According to this embodiment, an end of the lateral surface 111 of the top case 110 is folded inward and a hem 113 is formed to form the stepped protrusion 114. In a top case formed of a metallic material such as SUS, the hem 113 may be easily processed.

Both of the stepped protrusion 114 and the coupling projection 117 may be formed using the hem 113. The coupling projection 117 may be positioned closer to the back surface than the stepped protrusion 114, such that the coupling groove 155 may be positioned closer to the back surface than the hooking protrusion 135.

Figure 7:
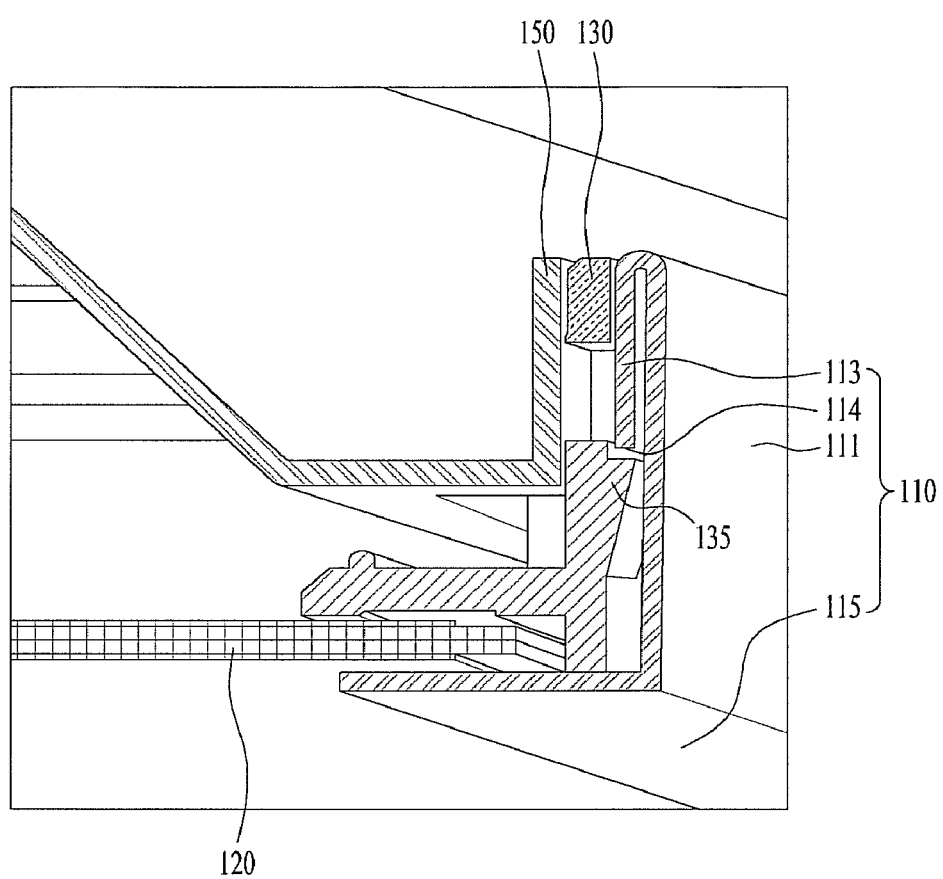
FIG. 7 is a side sectional view taken along line B-B' shown in FIG. 1.

FIG. 7 is a sectional view taken along line B-B' shown in FIG. 1, showing the stepped protrusion 114 formed in the lateral surface 111 of the top case 110 insertedly fitted to the hooking protrusion 135 formed in a lateral surface of the guide panel 130. The coupling projection 117 is inserted in the coupling groove 155 to couple the top case 110 to the front of the back cover 150. After that, the hooking protrusion 135 and the stepped protrusion 114 may be engagingly fitted to each other and the top case 110 may be coupled to the back cover 150 and the display panel 120.

The hem 113 may be formed along an overall inner edge portion of the lateral surface 111 of the top case 110. As mentioned above, the hem 113 may be partially cut away to form the coupling projection 117. The coupling portion may be formed in the hem 113 such that the exterior appearance may be maintained.

The lateral surface 111 of the top case at a portion under the display device 100, in other words, facing the floor, is not exposed, when the display device 100 is typically used. A screw may be used in coupling the top case 110, the back cover 150 and the guide panel 130 to each other in this area.

FIG. 8 is a side sectional diagram of the display device 100 according to this embodiment. A printed circuit board and various electronic parts configured to control and drive the display device 100 may be mounted at an outer portion of the top case 110. A rear cabinet 160 may be coupled to the top case 110 to cover the printed circuit board and other electronic parts. The rear cabinet 160 may be positioned behind the back surface of the back cover 150 and may not affect the exterior appearance. Accordingly, as shown in FIG. 8, the rear cabinet 160 may be coupled to the back cover 150 using a screw 170, or other fastener as appropriate.

Figure 9:
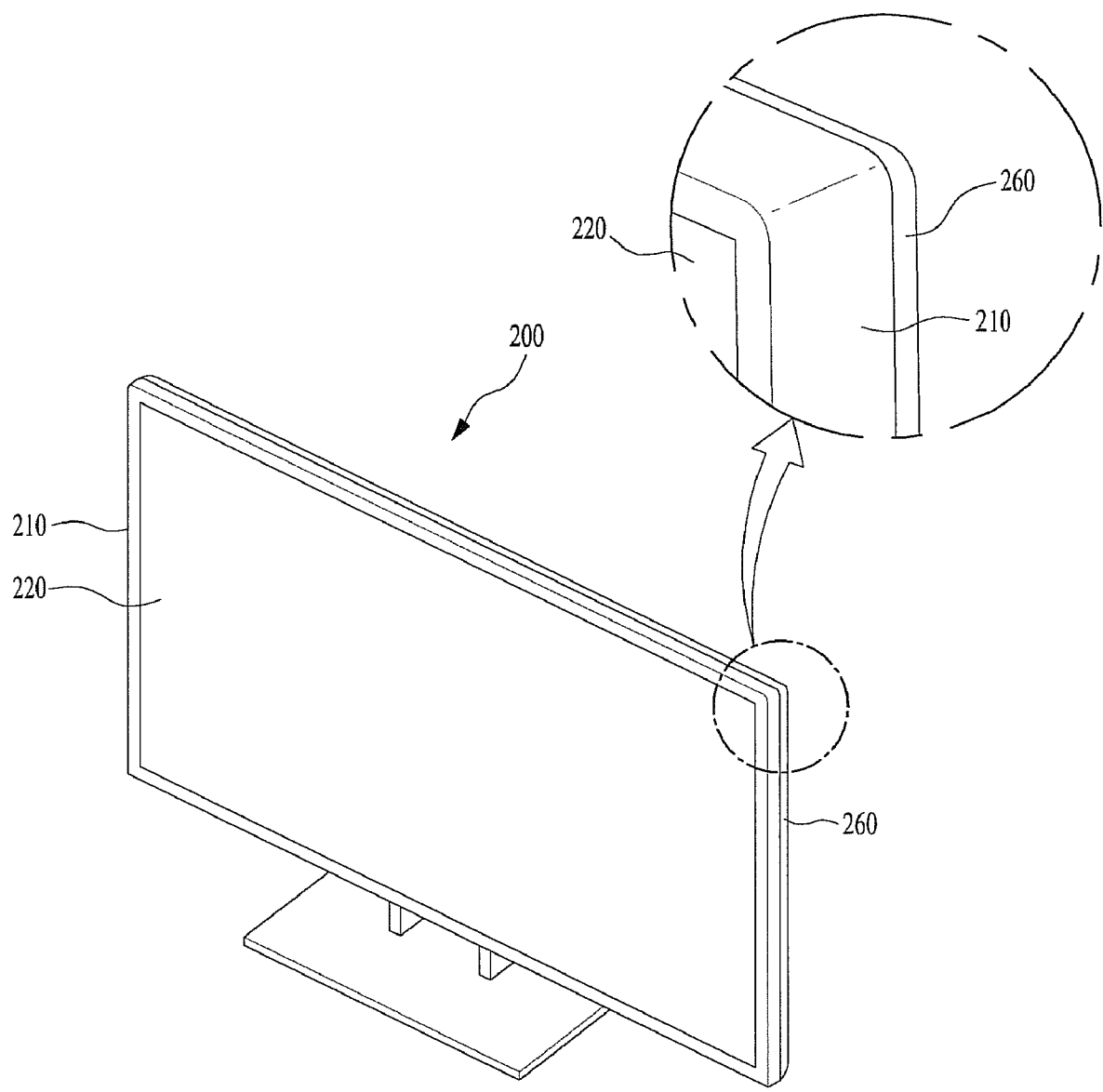
FIG. 9 is a perspective view of a display device according to another embodiment as broadly described herein.

FIG. 9 is a perspective view of a display device 200 according to another embodiment. As shown in FIG. 9, in the display device according to this embodiment, no front cabinet is provided and a top case 210 configured to fix members of a display module 220, 230 and 240 may also serve as an exterior finishing material. In this embodiment, a screw 270 configured to fasten the top case 210 and a back cover 250 to each other is not exposed outside.

Figure 10:
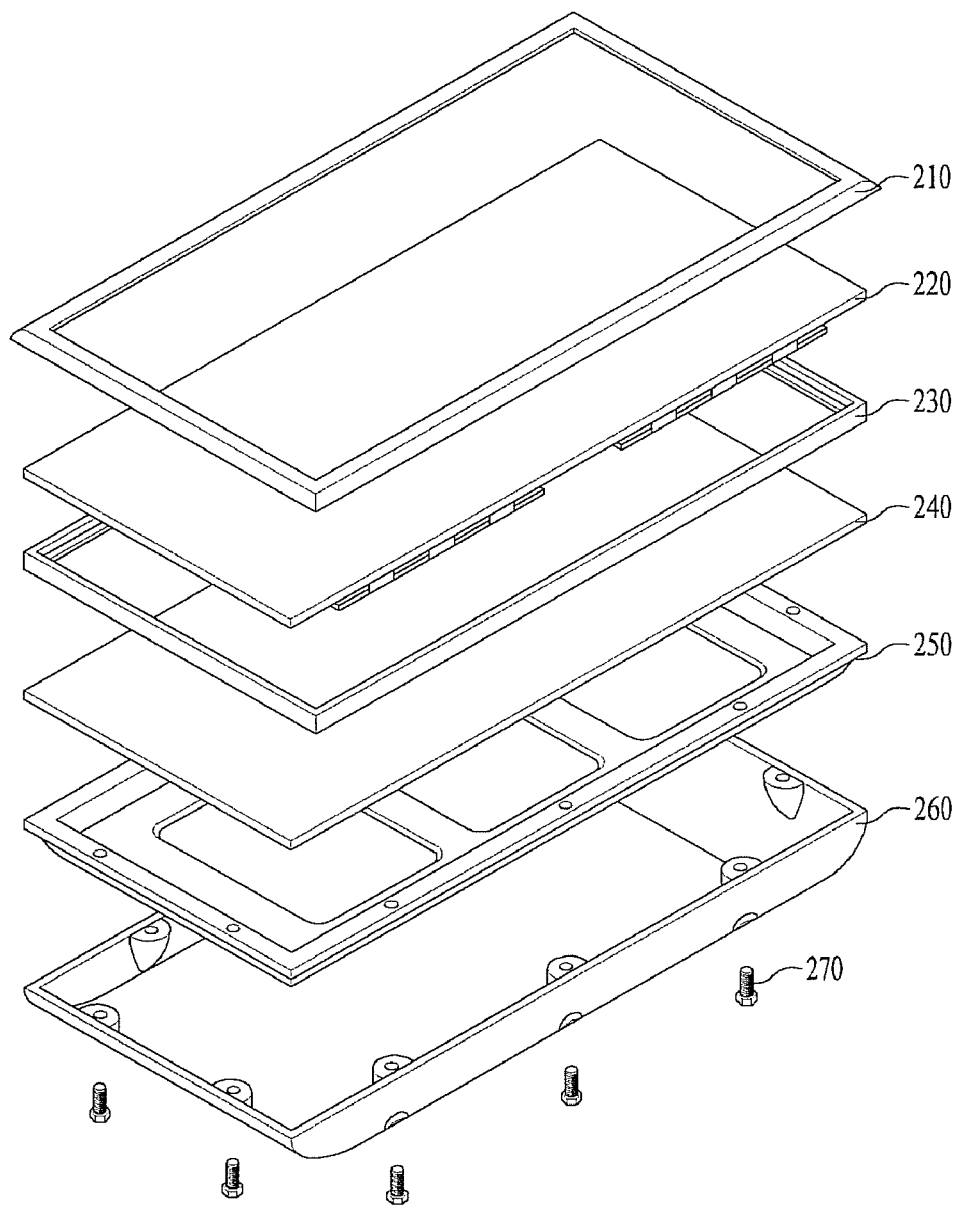
FIG. 10 is an exploded perspective view of the display device shown in FIG. 9.

As shown in FIG. 10, the display device 200 may include a top case 210, a display panel 220, a guide panel 230, a light guide panel 240, a back cover 250 and a rear cabinet 260.

The display panel 220, the guide panel 230 and the light guide panel 240 may be layered sequentially to form a display module. The display panel 220 may selectively transmit light provided from a rear surface there through by changing arrangement of liquid crystals. The display panel 220 controls a transparency and a color for each of the pixels so as to display a screen based on image information. A liquid crystal is injected between two transparent glasses and electric currents may flow to transparent electrodes formed on the transparent glasses to change the arrangement of the liquid crystals for each pixel, such that the display panel 220 may control the transparency of the pixel.

A light source arranged at a back side of the display panel 220 to provide light may be coupled to the back cover 250. The light source may use a point light source such as a light emitting diode (LED). The light guide panel 240 may supply such point light sources to the back side of the display panel 220 uniformly. The light guide panel 240 may convert the point light sources into surface light sources and emit the surface light sources in a forward direction uniformly. The light guide panel 240 may include a light guide film, a diffusion film and a prism film that are layered sequentially.

Figure 11:
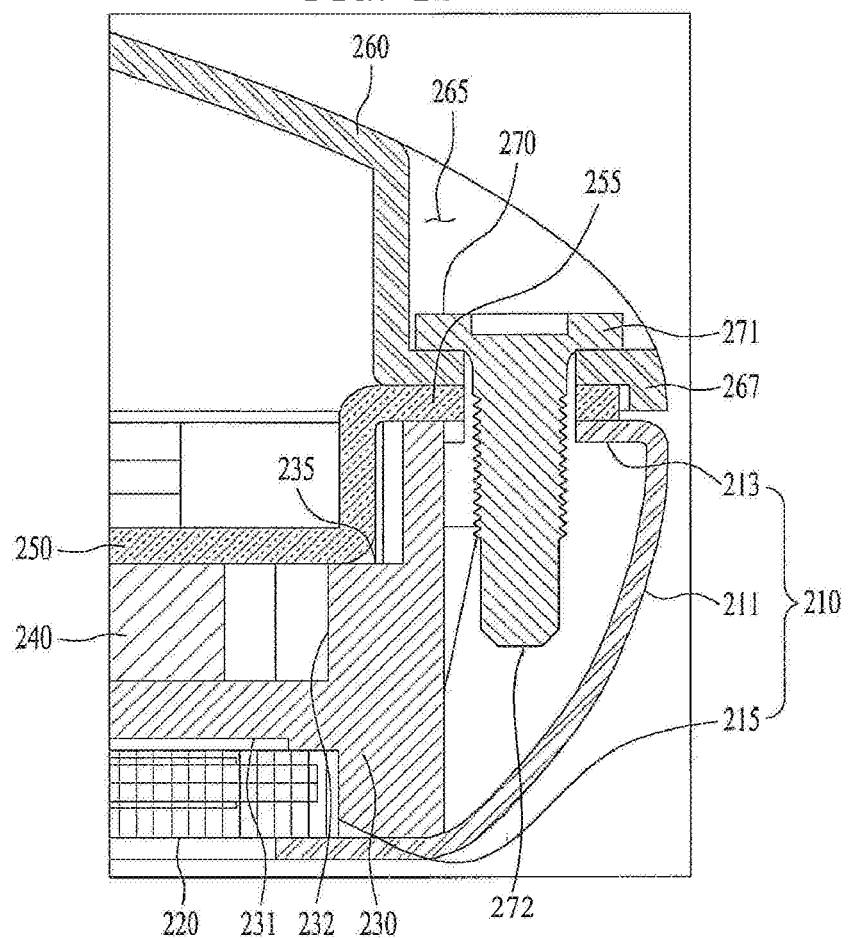
FIG. 11 is a side sectional view of the display device shown in FIG. 9.

The guide panel 230 may align the display panel 220 and the light guide panel 240. Referring to FIG. 11, the guide panel 230 may include a seating portion 231 and a guide wall 232. The seating portion 231 may be formed in a front surface of the guide panel 230 to support an edge portion of a back surface of the display panel 220 and an edge portion of a lateral surface of the display panel 220. The guide wall 232 may be formed in a lateral surface of the guide panel 230 and the films of the light guide panel 240 may be disposed on a back side of the guide wall 232.

The top case 210 may be coupled to a front surface of the display module and the back cover 250 may be coupled to a back side of the display module, to fix the layered structure including the display panel 220, the guide panel 230 and the light guide panel 240. The coupling of the top case 210 and the back cover 250 may support the front and back surfaces of the display module with a predetermined force sufficient to make each layer of the display module stay together, such that a screw 270 may be used.

The screw 270 may provide a relatively strong coupling force, but may also have an exposed head portion. In the embodiment shown in FIGS. 10 to 13 the screw 270 is coupled to the back surface of the display module and not visibly exposed.

As shown in FIG. 11, an end of the top case 210 may be bent inward and a coupling surface 213 may be formed toward the back surface, to insert the screw 270 in the back surface so as to couple the back cover 250 and the top case 210 to each other.

The back cover 250 may form a step bent twice in a " " shape. The step may be formed in an edge portion of the back cover and overlapped with the coupling surface 213. The back cover 250 may also include a wing portion 255 extended toward the coupling surface 213 of the top case 210.

Figure 12:
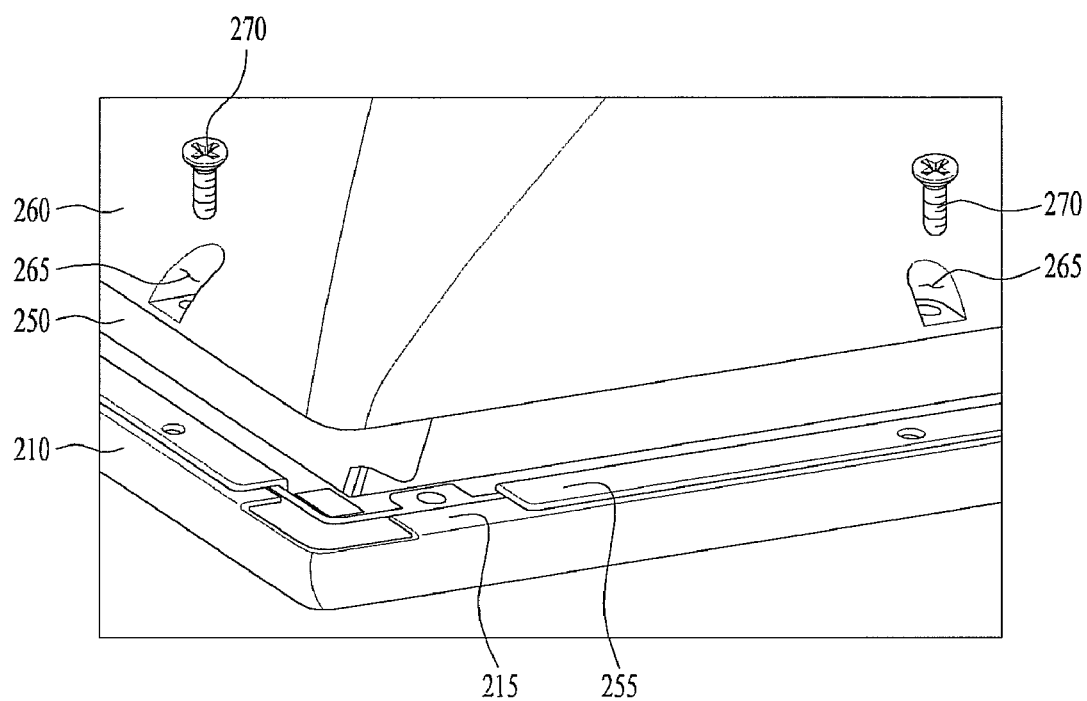
FIG. 12 is a rear perspective view in which a rear cabinet is separated from the display device shown in FIG. 9.

As shown in FIG. 12, the screw 270 may pass through the wing portion 255 of the back cover 250 and the coupling surface 213 of the top case 210 from the back surface, such that the back cover 250 and the top case 210 may be coupled to each other.

The top case 210 and the back cover 250 may be coupled to each other by the screw 270 and the rear cabinet 260 may be coupled on the back cover 250, such that the head portion 271 of the screw 270 may be covered, and not visibly exposed to the outside. Alternatively, the rear cabinet 260 may be coupled to the top case 210 and the back cover 250 by the screw 270 (see FIGS. 10 to 13).

An edge portion of the rear cabinet 260 may be seated on the wing portion 255 of the back cover 250 and the screw 270 may be coupled to the wing portion 255 of the back cover 250 and the coupling surface 213 formed in the end of the top case 210, passing through the rear cabinet 260 from a back surface of the rear cabinet 260.

When even the rear cabinet 260 is coupled by the screw 270, no further auxiliary coupling member need be provided to couple the rear cabinet 260, and only one screw 270 may couple the overall structure of the display device 200. Accordingly, an assembly process of the display device may be simplified.

In a case in which even the rear cabinet 260 is coupled together by the screw 270, the head portion 271 of the screw 270 could be exposed at the back surface of the rear cabinet 260. However, the back surface is out of the user's view when the display device 200 is installed. Thus, the head portion 271 of the screw 270 may not detract from the exterior appearance.

When a flat rear cabinet 260 is used, the lateral surface may be somewhat thick. Accordingly, when the rear cabinet 260 is formed in a curved shape having a convex center portion 265 extending toward the back surface as shown in FIG. 12, the display device 200 may appear slimmer.

It may be difficult to couple the curved-shaped rear cabinet 260 with the convex center portion 265 using the screw 270, because the edge portion of the curved-shaped rear cabinet 260 may be spaced apart a predetermined distance from the wing portion 255. Therefore, a predetermined edge portion of the rear cabinet 260 where the screw 270 is inserted may have a concave shape so as to be in close contact with the wing portion 255 of the back cover 250. Accordingly, the screw 270 may penetratingly couple the rear cabinet 260, the back cover 250 and the top case 210 to each other (see FIG. 11).

As the screw 270 is coupled from the back surface, there may be a predetermined space where an end 272 of the screw 270 is inserted. As shown in FIG. 11, a lateral surface of the top case 210 may be spaced apart a predetermined distance from a lateral surface of the display module, such that a predetermined space may be formed between the lateral surface of the display module. An end 272 of the screw 270 penetrating the rear cabinet 260, the back cover 250 and the top case 210 may be positioned in this space.

The size of the front surface 215 of the top case 210 may be enlarged so that a cross sectional area of the spaced distance is substantially rectangular. Simultaneously, the size of the bezel may be enlarged. To reduce the size of the bezel positioned at the front surface (the size of the front surface 215 of the top case 210), the lateral surface 211 may have an oblique curved shape to form the spaced distance. When the oblique curved-shaped lateral surface 111 is enlarged in the back surface, a front portion may reduce/maintain the size of the bezel.

The display module may be fixedly disposed between the back cover 250 and the top case 210. Especially, a lateral wall of the guide panel 230 configured to cover a lateral surface of the display module may include a step 235 where the " "-shaped bent portion of the back cover 250 for the wing 255 is seated.

Figure 13:
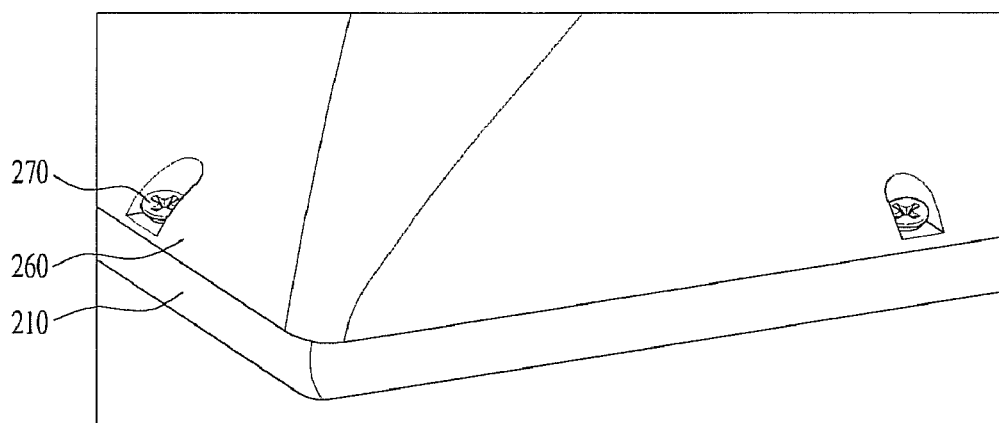
FIG. 13 is a rear perspective view of the display device shown in FIG. 9.

FIG. 12 is a rear perspective view in which a rear cabinet is separated from the display device, and FIG. 13 is a rear perspective view of the display device according to the embodiment. When the coupling surface 213 of the top cover end and the wing portion 255 of the back cover 250 are coupled to each other by the screw 270 as shown in FIG. 12, the head 271 of the screw 270 may be visible only at the back surface and does not detract from the exterior appearance.

As shown in FIG. 11, an end 267 of the rear cabinet 260 may extend toward the front surface so that the end of the back cover 250 is not exposed. The end 267 may cover the wing portion 255 of the back cover 250 so that the wing portion 255 is not visible.

Referring to FIGS. 14 to 17, a display device 300 according to another embodiment may include a screw 370 coupled to a lateral surface 311 of a top case 310 and a rear cabinet 360 covering a head 371 of the screw 370.

The display device 300 may include a top case 310, a display panel 320, a guide panel 330, a light guide panel 340, a back cover 350 and a rear cabinet 360. Like the embodiments mentioned above, the display module may include the display panel 320, the guide panel 330 and the light guide panel 340 layered sequentially. A light source arranged at a back side of the display panel 320 to provide a light may be coupled to the back cover 350. The detailed description of each element is the same as the corresponding description mentioned above and will be omitted accordingly.

A screw 370 according to this embodiment may be inserted in a lateral surface of the top case 310 to couple the top case 310 to the back cover 350. A lateral surface of the display device 300 may be visible to a user and the lateral surface 311 of the top case 310 may be covered by the rear cabinet 360 so that the head 371 of the screw 370 is not visible to the user. The rear cabinet 360 may cover only a predetermined portion of the lateral surface of the top case 310 while another predetermined portion 312 is exposed.

Figure 15:
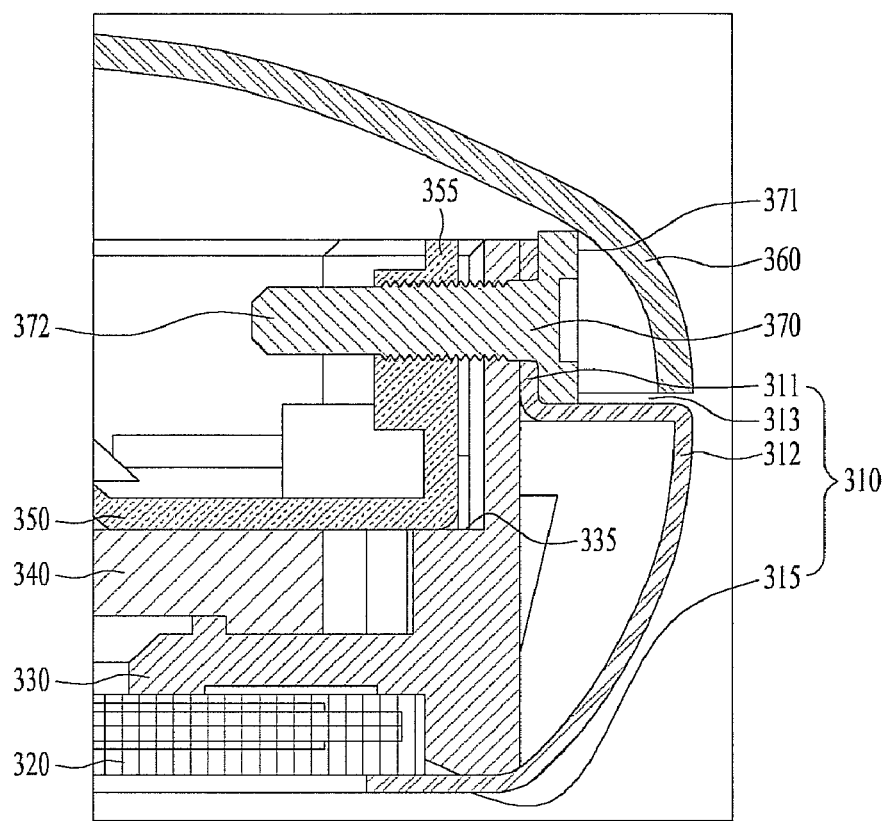
FIG. 15 is a side sectional view of the display device shown in FIG. 14.

Referring to FIG. 15 showing a cross section of the lateral surface of the display device 300, the lateral surface of the top case 310 may include a first lateral surface 311 adjacent to a back surface and a second lateral surface 312 adjacent to a front surface. The screw 370 may be inserted in the first lateral surface 311 and the rear cabinet 360 may be coupled to the first lateral surface 311.

To form continuous surfaces in the second lateral surface 312 and the rear cabinet 360 so that a connected portion between the rear cabinet 360 and the top case 310 is not noticeable, a step 313 may be formed to make the first lateral surface 311 further recessed than the second lateral surface 312. A predetermined opening may be formed in the recessed first lateral surface 311 to insert the screw therein and to form a continuous surface with the second lateral surface 312 of the top case 310. A third surface 313 is also shown.

An end 355 of the back cover 350 may be positioned in an inner portion of the first lateral surface 311 and the screw 370 may be fastened via the first lateral surface 311 of the top case 310 and the end 355 of the back cover 350. The end 355 of the back cover 350 may be bent once in a "L" shape and extend toward the back surface.

The guide panel 330 of the display module may be disposed between the first lateral surface 311 of the top case 310 and the end 355 of the back cover 350, to be coupled together with the top case 310 and the back cover 350.

The guide panel 330 may further include a stepped portion 335 where the L-shaped bent portion of the back cover 350 is seated. The guide panel 330 including the stepped portion 335 may guide the disposition of the display module and the coupling of the back cover 350.

The second lateral surface 312 of the top case 310 may form the step with the first lateral surface 311, spaced apart a predetermined distance from the display module. When the second lateral surface 312 of the top case 310 is perpendicular to the front surface 315 of the top case 310 by enlarging the stepped portion and the front surface 315 of the top case 310, the bezel may be enlarged.

As the size of the bezel increases, the appearance of the display device may degrade and the screen may appear smaller. To reduce the size of the bezel, the second lateral surface 312 may be formed in an oblique curved shape as shown in FIG. 15.

A predetermined portion of the second lateral surface 312 adjacent to the first lateral surface 311 may form a step with a lateral surface of the display module 320, 330 and 340, to be spaced apart a predetermined distance. Another predetermined portion of the second lateral surface 312 adjacent to the front surface 315 of the top case 310 may be adjacent to the lateral surface of the display module, such that the size of the bezel may be minimized.

Figure 14:
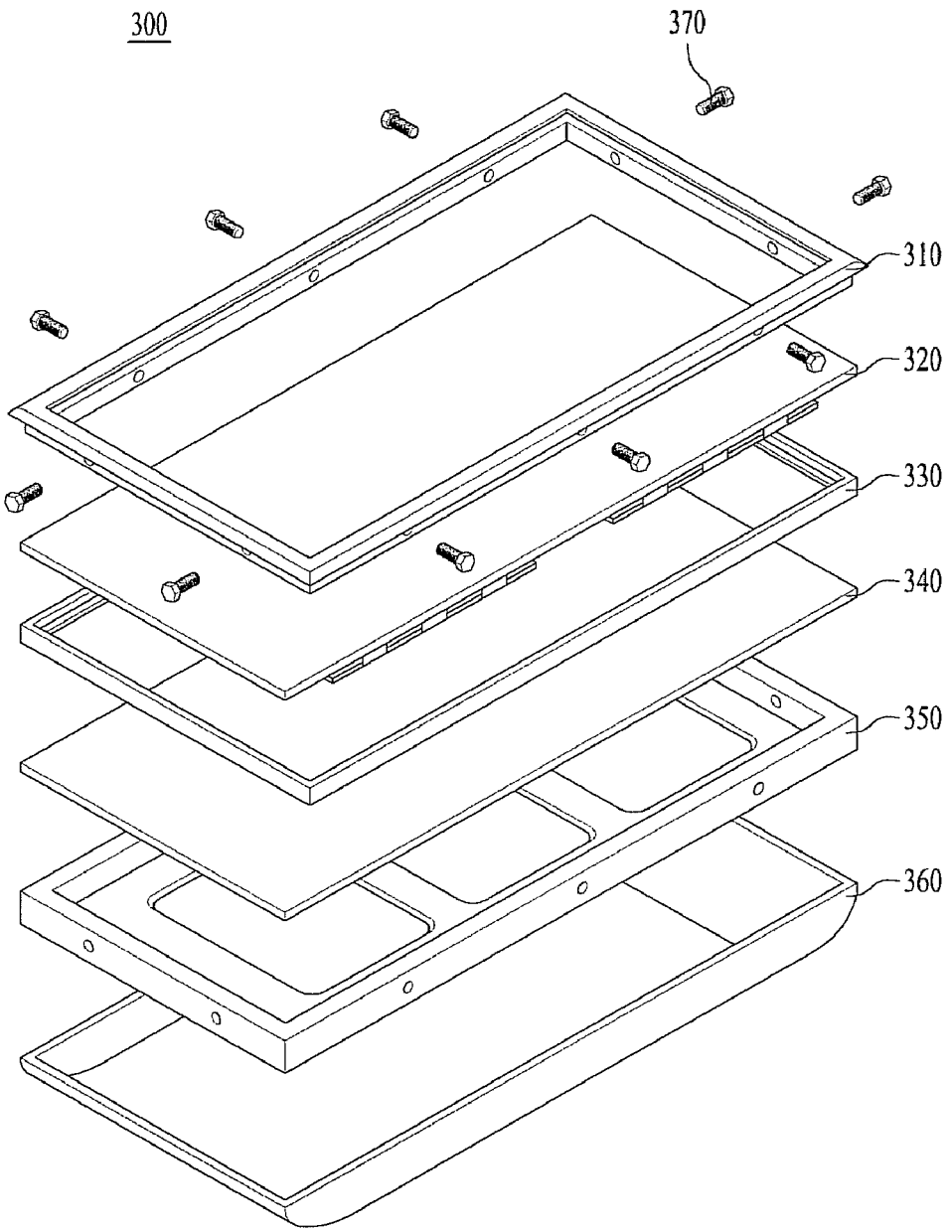
FIG. 14 is an exploded perspective view of a display device according to another embodiment.
Figure 16:
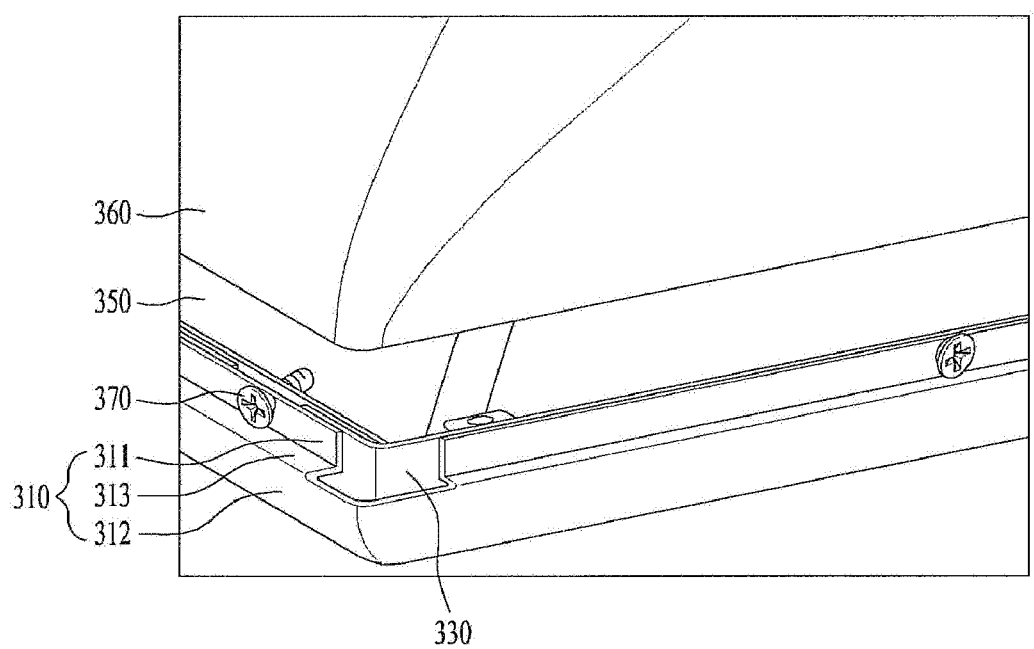
FIG. 16 is a rear perspective view in which a rear cabinet is separated from the display device shown in FIG. 14.
Figure 17:
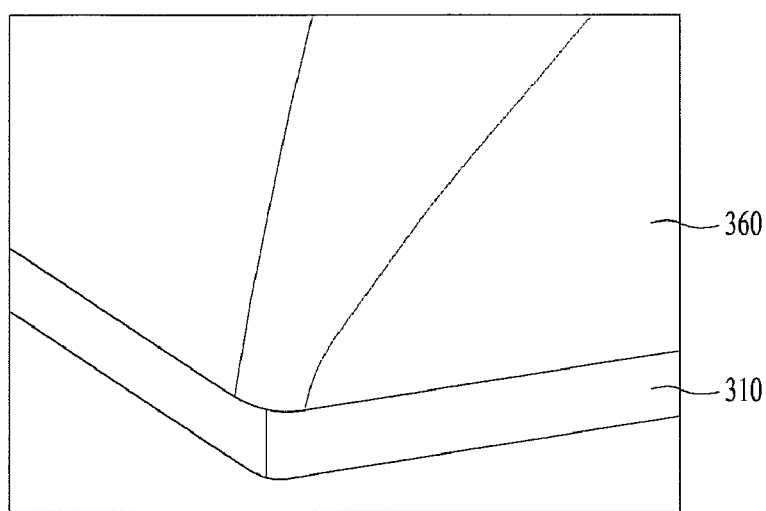
FIG. 17 is a rear perspective view of the display device shown in FIG. 14.

FIG. 16 is a rear perspective view of the rear cabinet 360 separated from the display device 300 according to the embodiment of FIG. 14, and FIG. 17 is a rear perspective view of the display device 300 according to the embodiment. When the rear cover 360 covers the screw 370 penetrating the first lateral surface 311 of the top case 310 and the lateral wall of the back cover 350 as shown in FIG. 16, the screw is not exposed to the outside as shown in FIG. 17.

As described above, a display device according to embodiments as broadly described herein includes the top case configured to fix the structure of the display module while not exposing the coupling structure at the lateral surface. Accordingly, a front cabinet may be omitted and the top case may serve as an exterior material, a number of parts may be reduced and cost may be reduced.

Furthermore, a double structure including a front cabinet covering the overall edge portion of the front surface of the display panel and the top case may be integrated into the single structure, reducing the size of the bezel.

A display device is provided that may reduce the number of elements provided therein so as to reduce production cost and processes, with a reduced size bezel on a front screen.

A display device, as embodied and broadly described herein, may include a display module; a back cover configured to support a back surface of the display module; a top case configured to cover an edge portion of a front surface of the display module or a lateral surface of the display module, the top case comprising a coupling portion formed in an lateral surface to be coupled to the lateral surface of the display module and an edge portion of the back cover; and a rear cabinet configured to cover a back surface of the back cover, wherein the lateral surface of the top case is exposed outside.

The coupling portion may include a coupling projection having a lateral surface projected inward and extended backward, and the coupling projection may be coupled to a coupling groove projected from an edge portion of the back cover or the lateral surface of the display module, with being open toward the front surface.

The coupling portion may include a stepped protrusion projected toward a front surface formed in an inner edge portion of the lateral surface of the top case; and a hooking protrusion formed in a predetermined portion of a lateral surface of the display module or an edge portion of the back cover, where the coupling groove is not formed, toward a back surface, and the stepped protrusion is engagingly coupled to the hooking protrusion to prevent the separation of the top case.

The display module may include a light source coupled to the back cover to supply a light to the light diffusion part; a light diffusion part configured to uniformly supply the light supplied by the light source to a front surface; a display panel configured to control a transparency and a color for each of pixels based on image information; and a guide panel configured to lateral edge portions of the display panel and the light diffusion part and to guide the disposition of the display panel and the light diffusion part, and the hooking protrusion may be formed in an outer portion with respect to a lateral surface of the guide panel.

In another embodiment as broadly described herein, a display device may include a display module; a back cover configured to support a back surface of the display module; a top case configured to cover an edge portion of a front surface of the display module or a lateral surface of the display module, the top case coupled to the back cover; a screw coupled to the top case, with penetrating an edge portion of the back cover; and a rear cabinet configured to cover a back surface of the back cover, with an edge portion coupled to the top case, wherein a predetermined portion of the top case is exposed outside when the top case is coupled to the rear cabinet.

The back cover may also include a wing portion extended from an end of the edge portion outward to cover a lateral surface end of the top case, and the screw is coupled to the lateral surface end of the top case toward a back surface, with penetrating the wing portion.

A lateral surface of the top case may include a first lateral surface adjacent to a back surface of the top case and a second lateral surface adjacent to a front surface of the top case, and an end of an edge portion of the back cover may be bent once in L shape to be extended toward a back surface, and the screw may be coupled to the first lateral surface in a lateral direction, penetrating the bent end of the back cover, and the rear cabinet may be coupled to the first lateral surface.

A display device as embodied and broadly described herein includes the top case configured to fix the structure of the display module and while not exposing the coupling structure at the lateral surface. Accordingly, a front cabinet may be omitted and the top case may be used as an exterior material. By omitting the front cabinet, the number of parts may be reduced, and cost may be reduced.

Furthermore, a double structure including a front cabinet covering the overall edge portion of the front surface of the display panel and a top case may be integrated into the single structure so that the size of the bezel may be reduced.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A display device comprising:
   a back cover;
   a plurality of light sources coupled to the back cover;
   a guide panel positioned at the back cover, the guide panel including a seating portion, and a guide wall portion;
   a display panel supported on the seating portion of the guide panel;
   a top case including a front part covering an edge portion of a front surface of the display panel and a lateral part covering the guide wall portion of the guide panel, wherein the lateral part of the top case comprises a first part and a second part, the first part being further recessed than the second part; and a fastener that couples the top case, the guide panel, and the back cover by penetrating the first part of the top case, the guide wall portion of the guide panel and an edge of the back cover, wherein a first end of the fastener is placed at the first part of the top case, wherein an inner surface of the first part of the top case contacts the guide wall portion of the guide panel, wherein a second end of the fastener protrudes through the edge of the back cover, wherein the second part of the lateral part of the top case is exposed to an outside of the display device, wherein the guide wall portion includes:

a first portion elongated toward a front side of the display device; and a second portion elongated toward a rear side of the display device and placed between the edge of the back cover and a first part of the top case.

2. The display device of claim 1, wherein the edge of the back cover forms an L-shaped bent portion, and wherein the guide panel further includes a stepped portion for seating the L-shaped bent portion.

3. The display device of claim 1, wherein the second part of the top case is not in contact with the guide wall portion.

4. The display device of claim 1, wherein the second part of the lateral part of the top case is substantially flush with respect to an outer surface of a rear cabinet covering the first end of the fastener and the first part of the top case.

5. The display device of claim 1, wherein the fastener penetrates through a first hole formed at the first part of the top case, a second hole formed at the guide wall portion, and a third hole formed at the back cover.

6. The display device of claim 1, wherein an end of the first portion contacts the front part of the top case.

7. The display device of claim 1, further comprising a rear cabinet that covers the first end of the fastener and the first part of the top case, wherein the rear cabinet and the second part of the lateral part of the top case form an exterior surface of the display device.

8. The display device of claim 1, wherein the first part of the top case comprises a horizontal first part and a vertical first part, an end of the horizontal first part and an end of the vertical first part being spaced apart at a corner portion of the top case, wherein the second part of the top case comprises a horizontal second part and a vertical second part, an end of the horizontal second part and an end of the vertical second part connected to each other at the corner portion of the top case, and wherein an outer surface of the second part of the top case is an exterior surface of the display device.

9. The display device of claim 8, wherein each of the horizontal first part and the vertical first part has a continuous surface elongated in a vertical and a horizontal direction, respectively.

* * * * *